FIG. 1

PERCIVAL C. KEITH
JOSEPH W. JEWELL
INVENTORS

Patented July 18, 1950

2,515,373

UNITED STATES PATENT OFFICE 2,515,373

CATALYTIC CONVERSION OF HYDROCARBONS

Percival C. Keith, Peapack, and Joseph W. Jewell, Summit, N. J., assignors to The M. W. Kellogg Company, Jersey City, N. J., a corporation of Delaware Application April 24, 1941, Serial No. 390,164

3 Claims. (Cl. 196—52)

The present invention relates to improvements in process and apparatus for effecting catalytic conversions. In its specific aspects the invention is directed particularly to an improved continuous process of converting hydrocarbons by treatment over catalytic materials which become spent or deactivated during the conversion, and which accordingly require periodic regeneration treatment to fit them for reuse in the conversion step. The catalytic conversion of high boiling hydrocarbons such as petroleum gas oil and the like into low boiling hydrocarbons within the gasoline boiling range is an example of the latter type of conversion reaction of outstanding importance.

It has been proposed heretofore to catalytically convert high boiling hydrocarbons such as gas oil to low boiling hydrocarbons within the gasoline boiling range by passing vapors of the high boiling hydrocarbons under suitable reaction conditions in contact with a stationary bed of a cracking catalyst disposed in a catalyst chamber. Pursuant to such processes, after the activity of the catalyst is decreased by reason of the formation of a carbonaceous deposit thereon to an extent where regeneration is necesary or desirable, the activity of the catalyst is restored by stopping the flow of oil vapor to the chamber and passing an oxygen-containing gas into the chamber in contact with the spent catalyst, thereby regenerating it in situ by combustion of the carbonaceous deposit. Although such processes are commercially practicable they are subject to a number of inherent limitations and disadvantages which are eliminated by the present invention. Among these are the intermittent nature of the operation, variations in product quality and quantity during the reaction period and difficulty in temperature control, particularly in the regeneration operation.

A process whereby various of the objectionable limitations and disadvantages of the stationary bed or intermittent type of operation are eliminated is described in U. S. Patent No. 2,350,730 to Keith et al., dated June 6, 1944. In accordance with the Keith et al. process continuous operation and uniformity in yield and quality of products in the practice of catalytic reactions such catalytic cracking and the like, is obtained by a procedure wherein the vapors of the oil undergoing conversion are passed in contact with a compact mass or moving bed of catalytic material confined in a reaction zone, and the average catalytic activity of the catalytic mass is maintained substantially constant by adding active catalyst thereto and removing spent catalyst therefrom without interruption of the flow of oil vapor through the reaction zone.

In the process disclosed by said Keith et al. application the catalyst is employed in granular condition and the movement of the catalyst through the conversion zone is effected by gravity flow at regulated rates controlled by suitable mechanical discharging means. Accordingly, the process is subject to certain limitations which are obviated by the present process. The primary object of the present invention is the provision of a process wherein the catalyst is introduced into the conversion and regeneration zones in finely divided or powdered condition and at the same time certain of the variable operating conditions are so controlled as to maintain a suitable concentration of the catalyst in said zones for the desired conversion and regeneration effects in an apparatus of feasible dimensions. The various features and advantages of the process will be evident from the following detailed description thereof given in connection with the appended drawings wherein:

Figure 2:
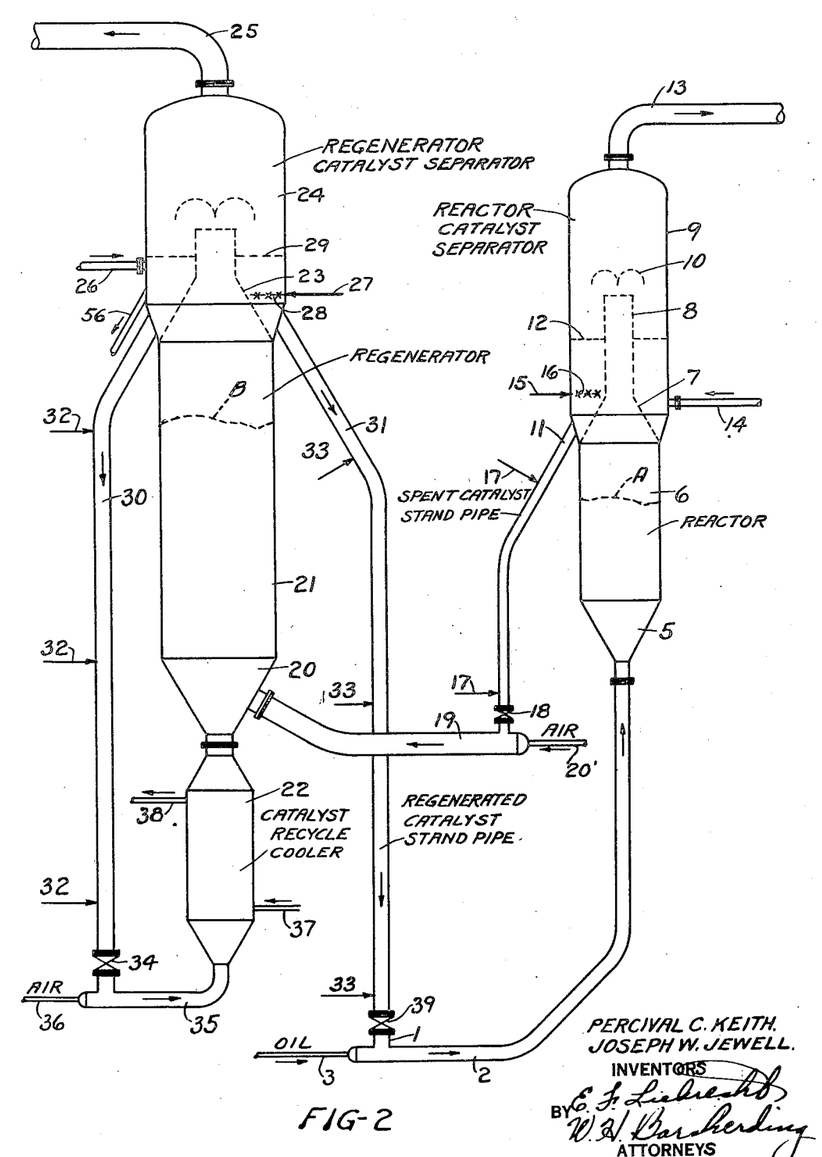
Fig. 2 is an elevation view of the reactor or conversion chamber and the catalyst regeneration chamber or regenerator, and illustrates the details of these elements and their interconnection.

The steps of catalytic conversion and regeneration of the catalyst as preferably practiced pursuant to this invention may be more readily understood by reference to Fig. 2. As indicated thereon, a finely divided or powdered active catalyst is introduced through the outlet 1 of a catalyst standpipe 31 into a stream of the feed vapors traveling at a relatively high velocity through the reactor inlet line 2. Both the catalyst and vapors preferably are heated prior to their mixture in their line 2 to an elevated temperature suitable for the subsequent conversion. Vaporized feed may be supplied to line 2 by a transfer line 3 leading from a heater 4 or other suitable source of vaporized feed stock. Catalyst thus introduced is picked up by the vapors and carried therewith through line 2 into a conical inlet 5 in the lower part of reactor 6. Reactor 6 is a vessel, in the form of a cylinder or other suitable shape, having a relatively great cross-sectional area compared to the cross-sectional area of the vapor inlet line 2, and these relative proportions cause a corresponding reduction in the velocity of the vapors after their passage from inlet line 2 into the reactor 6. The velocity of the vapors in reactor 6 is preferably maintained within such limits as to produce a concentrated or dense phase of the catalyst which state may conveniently be designated as "fluidized." This "fluidized" condition, in general, is characterized by the relatively high concentration of catalyst measured in terms of the quantity of catalyst per unit volume of reactor space, and by the maintained low velocity of reactant vapors through the reactor.

The reactant vapors travel upwardly through the reactor in contact with the fluidized catalyst and during this period of contact undergo the desired conversion. Operating conditions in the reactor determined by variables such as the dimensions of the reactor, and the temperatures and rates at which reactant vapors and catalyst are supplied thereto, are maintained within such limits as to bring about the desired quality and extent of conversion as described in detail hereinafter.

Figures 3, 4:
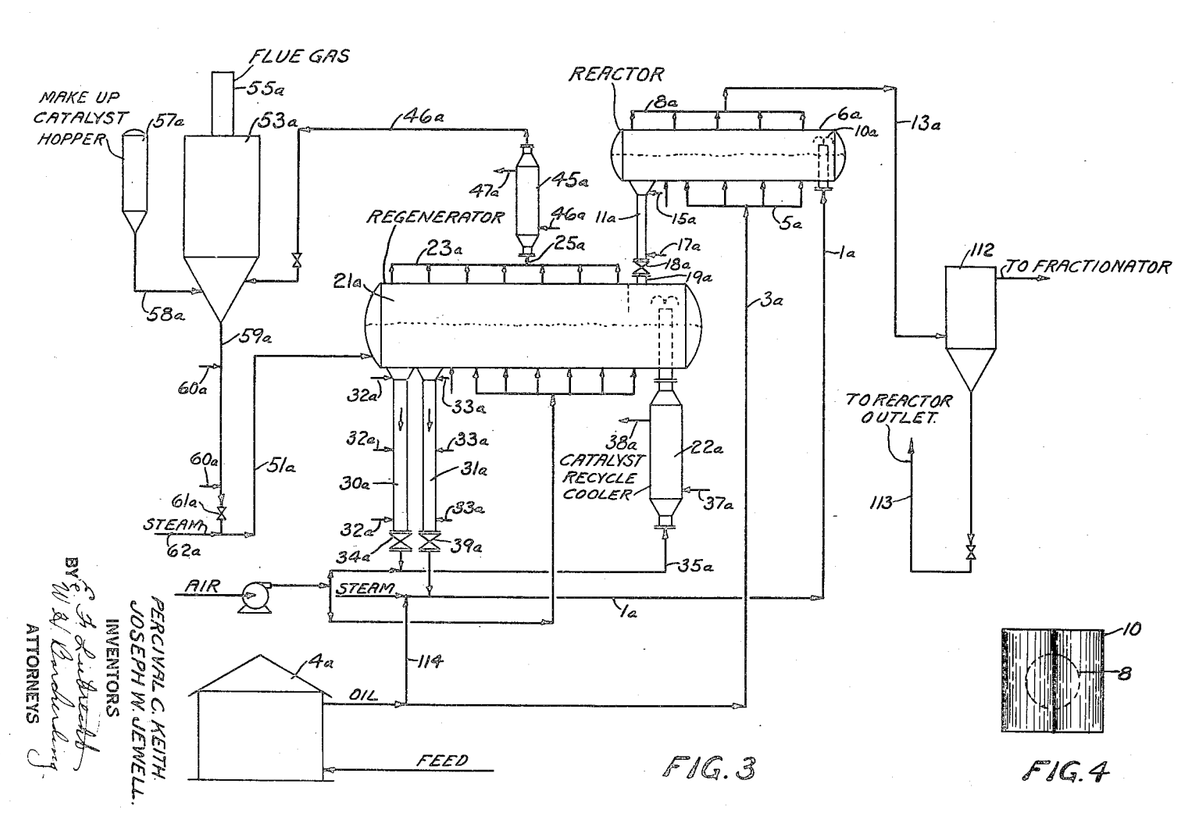
Fig. 3 is a view similar to Fig. 2 of a modified form of reactor and regenerator.
Fig. 4 is plan view illustrating the details of the baffle device.

The vaporous reaction products are withdrawn from the upper part of the reactor through a suitable outlet pipe or cone 7. It is contemplated that the used or spent catalyst may be separated from the vaporous conversion products by any one of several novel methods. According to that illustrated in Fig. 2, the vapors pass from the upper portion of the reactor into the conical outlet 7 of decreasing cross-sectional area wherein their velocity is progressively increased and then into an outlet pipe 8 of relatively restricted cross-sectional area compared to that of the reactor. The vaporous conversion products mixed with spent catalyst exit through the outlet pipe 8 at a relatively high velocity into a settling chamber or collecting hopper 9 of such cross-sectional area that the velocity of the vapors therein is preferably of about the same order of magnitude but may be more or less than the vapor velocity in reactor 6. A baffle 10, shown in plan in Fig. 4, is preferably interposed directly in the path of the vapor mixture exiting from pipe 8 whereby the mixture is directed laterally and downwardly thus functioning to propel catalyst particles present in the mixture out of the path of the vapor flow into a quiescent collecting zone defined by the inner walls of the outlet cone 7 and outlet pipe 8 and the lower inner walls of the settling or collecting hopper 9. Catalyst thus separated is withdrawn through suitable means such as catalyst standpipe 11 opening into the lower part of the collecting zone. A quantity of catalyst is preferably left at all times in said zone to maintain a level of catalyst therein at a substantial distance above the spent catalyst outlet opening as indicated by dotted line 12. Vaporous conversion products are withdrawn from the upper part of the collecting hopper through line 13 mixed with a relatively small portion of the catalyst originally present in the mixture passing through pipe 8. The effectiveness of the separation in chamber 9, as demonstrated hereafter by specific examples, is much greater than that predictable from theoretical conclusions based upon a consideration of such known factors as the particle sizes and settling rate of the catalytic material employed and the fact that the vapor velocity in chamber 9 may be of the same order of magnitude as those utilized to carry the particles through reactor 6.

Residual catalyst left in the vaporous conversion products exiting through line 13 to separated in a suitable recovery system described in detail hereinafter in connection with the Fig. 1, and may be returned to the spent catalyst separated in chamber 9 through line 14.

A suitable stripping medium such as steam is introduced through a line 15 having suitable fluid distributing means 16, in the bottom of the mass of catalyst in the collecting zone to strip or displace hydrocarbon vapors absorbed thereon or entrained therewith and to maintain the mass in an aerated flowable condition. While only one such line 15 for introduction of the stripping medium is shown, it is to be understood that any suitable number may be employed and be so distributed throughout the collecting chamber as to assure the required stripping and aerating effects. The quantity of stripping steam is preferably such that its velocity in the collecting zone is low, that is, of the order of about 0.1 to 0.3 foot per second. The stripping medium and stripped oil vapors pass out of chamber 9 overhead through line 13 together with the vaporous conversion products.

As illustrative of the operating conditions preferably maintained in the reaction zone reference is made to the data tabulated in the following Tables 1—A and 1—B, wherein Table 1—A represents conditions suitable for a large scale commercial unit for a given type of charging stock and capacity, and Table 1—B, contains data obtained in the operation of a unit on a pilot plant or laboratory scale.

TABLE 1—A

| | |
|---|---|
| Gas oil feed, bbl./day | 10,000 |
| Steam feed, lbs./hr | 13,360 |
| Reactor dimensions (a), ht., ft | 28 |
| Reactor dimensions (b), dia., ft | 15 |
| Feed weight ratio of catalyst to oil | 5 |
| Reactor temperature, inlet cone 5, °F | 933 |
| Reactor temperature, outlet cone 7, °F | 900 |
| Reactor pressure, inlet cone 5, lbs./sq. in | 13.0 |
| Reactor pressure, outlet cone 7, lbs./sq. in | 9.6 |
| Vapor velocity, inlet, ft./sec | 1.48 |
| Vapor velocity, outlet, ft./sec | 2.45 |
| Ratio of weight of oil fed/hour to weight of catalyst in reactor (w./hr./w.) | 2.6 |
| Oil vapor, contact time, seconds | 13.6 |
| Catalyst time, seconds | 290 |
| Catalyst concentration, lbs./cu. ft.: | |
| (a) Inlet line 2 | 0.98 |
| (b) Reactor | 18.0 |
| (c) Reactor outlet, line 8 | 0.6 |

TABLE 1—B

| Run Number | 5264 | 5325.4 | 5320.1 | 5205 | 5336.1 | 5336.5 |
|---|---|---|---|---|---|---|
| Oil Feed, Liters/Hr.(31.1° API gas oil) | 11.7 | 15.0 | 15.2 | 19.8 | 15.7 | 15.7 |
| Steam Feed, Mol Per Cent | 59.7 | 61.3 | 60.4 | 58.3 | 58.9 | 62.9 |
| Reactor Dimensions: | | | | | | |
| (a) Ht.-Ft | 12 | 12 | 12 | 12 | 12 | 12 |
| (b) Dia.-In | 2.5 | 2.5 | 2.5 | 2.5 | 2.5 | 2.5 |
| Weight Feed Ratio of Catalyst to Oil | 4.0 | 3.1 | 3.6 | 2.1 | | |
| Reactor Temperature, Average °F | 900 | 900 | 895 | 900 | 985 | 985 |
| Reactor Pressure, Average, Lbs./Sq. In | 10.5 | 10.5 | 9.5 | 9.5 | 11.5 | 10.5 |
| Vapor Velocity, Inlet, Ft./Sec | 1.13 | 1.48 | 1.54 | 2.03 | 1.53 | 1.75 |
| Vapor Velocity, Outlet, Ft./Sec | 1.82 | 2.22 | 2.24 | 2.62 | 2.58 | 2.87 |
| Ratio of Weight of Oil Fed/Hr. to Wt. of Catalyst in Reactor W./Hr./W. | 3.8 | 6.4 | 8.0 | 13.5 | 8.3 | 7.4 |
| Oil Vapor, contact time, seconds | 8 | 6.5 | 6.4 | 5.2 | 5.8 | 5.2 |
| Catalyst Time, seconds | 240 | 360 | 126 | 126 | 168 | 114 |
| Catalyst Concentration, Lbs./Cu. Ft: | | | | | | |
| (a) Inlet | 0.75 | 0.58 | 0.65 | 0.37 | 0.49 | 0.71 |
| (b) Reactor | 17.0 | 12.8 | 10.3 | 7.9 | 10.3 | 11.5 |
| Yields: | | | | | | |
| (a) Gasoline, Vol. Per Cent | 47.1 | 43.3 | 43.6 | 31.4 | 43.9 | 48.3 |
| (b) Excess Butane | 4.6 | 2.6 | 3.4 | 1.2 | 5.5 | 7.1 |
| (c) Cycle Oil | 47.0 | 54.3 | 52.5 | 68.6 | 49.2 | 42.0 |
| (d) Gas, Wt. Per Cent | 4.1 | 3.2 | 3.2 | 1.8 | 5.7 | 6.7 |
| (e) Carbon | 5.1 | 3.5 | 4.4 | 1.9 | 3.5 | 4.4 |
| (f) Gasoline Octane No | | 79.1 | 79.9 | 80.7 | 81.7 | 80.6 |

In conveying the spent catalyst from the spent catalyst collecting zone to the regeneration zone suitable provision is made for any difference in pressure between these zones. A somewhat higher pressure is normally preferably maintained in the bottom or inlet portion of the regeneration zone than the pressure maintained in the collecting zone, and a head of suitably aerated or fluidized catalyst is preferably maintained in the outlet standpipe 11 of a sufficient magnitude to balance or exceed this differential pressure. For this purpose spent catalyst flowing through standpipe 11 is maintained in a condition in which it has the flow characteristics of a liquid by introducing in suitably regulated amounts an aerating medium such as steam through lines 17 at the bottom of and at other suitably spaced points along the length of pipe 11.

From the bottom of standpipe 11 spent catalyst is fed under the influence of the pressure head maintained therein and the pressure head provided by the mass of aerated catalyst in chamber 9 through a suitable feeding means such as a slide valve 18 into the regenerator inlet line 19.

Spent catalyst thus introduced is mixed with air or other suitable carrying medium such as steam introduced into pipe 19 by line 20'. In case air is employed, the quantity introduced is so controlled that the combustion of the spent catalyst in line 19 is not sufficient to raise the temperature of the catalyst beyond the maximum safe regeneration temperature.

The mixture of hot spent catalyst and carrying medium flows through line 19 into an inlet cone 20 at the bottom of the regenerator 21 where it meets and mixes with a stream of relatively cool recycled regenerated catalyst and air from cooler 22 and passes therewith upwardly through the regeneration chamber 21. Operating conditions in the regeneration chamber or zone 21 are preferably maintained to provide a condition similar to that maintained in the reaction zone with respect to a "fluidized" condition of the catalyst. This condition similar to that maintained in the reactor is characterized by the relatively large concentration of catalyst and low vapor velocities maintained in the regeneration zone. During the course of the travel of the spent catalyst upwardly through regeneration chamber 21 combustion of the carbonaceous deposit thereon is effected to the required extent at an elevated temperature maintained below the safe maximum regeneration temperature by means of the cooled recycled catalyst.

Gaseous regeneration products (flue gas) and regenerated catalyst exit from the upper part of the regenerator through an outlet 23 and into a separator 24 similar in design and mode of operation to separator 9 described in connection with the reactor. The major portion of the regenerated catalyst is separated and collected in a collecting zone at the bottom portion of the regenerated catalyst collecting hopper or separator 24 and the gaseous combustion products together with a relatively small amount of regenerated catalyst pass out overhead from chamber 24 through line 25 to a suitable recovery system such as that illustrated by and hereinafter described in connection with Fig. 1. Catalyst recovered from the vapors in line 25 may suitably be returned to hopper 24 through line 26.

Suitable means 27 and 28, similar to pipe 15 and distributor 16, are provided in the lower portion of hopper 24 to introduce a suitable medium such as steam to strip and displace flue gas absorbed or entrained with the regenerated catalyst and maintain the separated catalyst in an aerated flowable state. As in the case of the reactor a level of separated catalyst indicated by dotted line 29 is preferably maintained at a substantial distance above the catalyst outlet lines.

Regenerated catalyst is preferably withdrawn from separator 24 in a split stream, a portion being sent through regenerated catalyst recycle line 30, and another portion through regenerated catalyst line 31 leading to the conversion or reaction system. Both catalyst outlet lines 30 and 31 are pressure standpipes similar to standpipe 11 in that they are provided with means for introducing an aerating medium at suitable points along their length so as to maintain the catalyst flowing therethrough in a condition wherein it has the flow characteristics of a liquid, such means being lines 32 leading into recycle line 30 and lines 33 leading to catalyst outlet line 31. The quantity of catalyst withdrawn and recycled through line 30 is preferably maintained within predetermined limits so as to maintain the temperature in regeneration zone 21 within required limits in accordance with the principles of operation described in U. S. Patent 2,253,486 to Arnold Belchetz, dated August 19, 1941.

Regenerated recycle catalyst is fed from the bottom of standpipe 30 through a suitable feeding means such as a slide valve 34 into an inlet line 35 leading to a heat exchanger or catalyst recycle cooler 22. Regenerated catalyst thus introduced is picked up by air introduced into line 35 through line 36, the quantity of air thus introduced being sufficient together with any air introduced through line 20' to effect combustion to the required extent in the regenerator 21. From line 35 the mixture of air and regenerated catalyst passes through exchanger or cooler 22 wherein the temperature of the recycled catalyst is lowered by indirect heat exchange with a cooling medium circulated through the exchanger by lines 37 and 38.

Regenerated catalyst is fed to the conversion system from standpipe 31 through a suitable feeding means at the bottom thereof such as a slide valve 39 and line 1 into the stream of vapors to be converted passing through line 2 as previously described.

To illustrate the operating conditions preferably maintained in the regeneration zone, reference is made to the data tabulated in the following Tables 2—A and 2—B wherein regeneration zone operating conditions are shown corresponding to the conversion runs tabulated in Tables 1—A and 1—B.

TABLE 2—A

| | |
|---|---|
| Spent catalyst, lbs./hr | 632,840 |
| Cooled recycled catalyst, lbs./hr | 1,750,000 |
| Ratio by weight recycled/spent | 2.77 |
| Inlet temperature, spent catalyst, °F | 900 |
| Inlet temperature, recycled catalyst, °F | 840 |
| Temperature, mixture recycled and spent catalyst, °F | 850 |
| Temperature, regeneration chamber, °F | 1,000 |
| Regeneration dimensions: | |
| (a) Height, ft | 50 |
| (b) Diameter, ft | 18 |
| Regeneration velocity: | |
| (a) Base | 1.62 |
| (b) Top | 2.59 |
| Air feed, lbs./hr | 88,350 |

Catalyst concentration, lbs./cu. ft.:
  (a) Regenerator .................... 20.0
  (b) Outlet line .................... 1.02
Weight per cent of coke based on oil feed .................... 4.85
Coke per cent by weight on spent catalyst .................... 1.3
Carbon per cent by weight on regenerated catalyst .................... 0.7
Catalyst contact time, seconds .................... 352
Pressure in regenerator, lbs./sq. in.:
  (a) Inlet cone .................... 16
  (b) Outlet cone .................... 9

TABLE 2—B

| Run Number | 5264 | 5325.4 | 5320.1 | 5205 | 5336.1 | 5336.5 |
|---|---|---|---|---|---|---|
| Spent Catalyst, Lbs./Hr | 90 | 90 | 105 | 80 | 79 | 131 |
| Temperature, Regeneration Chamber, °F | 1,050 | 1,030 | 1,045 | 1,010 | 1,010 | 1,025 |
| Regenerator Dimensions: | | | | | | |
| (a) Height, Ft | 12 | 12 | 12 | 24 | 12 | 12 |
| (b) Diameter, In | 4 | 4 | 4 | 3 | 4 | 4 |
| Regenerator Gas Velocity: | | | | | | |
| (a) Base | 1.52 | 1.38 | 1.73 | 1.62 | 1.34 | 1.36 |
| (b) Top | 1.67 | 1.51 | 1.43 | 1.73 | 1.36 | 1.42 |
| Catalyst Concentration, Lbs./Cu. Ft.: | | | | | | |
| (a) Inlet | 0.19 | 0.21 | 0.24 | 0.28 | 0.19 | 0.30 |
| (b) Regenerator | 12.4 | 12.4 | 10.0 | 9.6 | 11.2 | 12.1 |
| Wt. Percent of Coke Based on Oil Feed | 5.1 | 3.5 | 4.4 | 1.9 | 3.5 | 4.4 |
| Coke Percent by Wt. on Spent Catalyst | 1.63 | 1.57 | 1.78 | 1.41 | 1.73 | 1.35 |
| Carbon Percent by Wt. on Regenerated Catalyst | 0.40 | 0.47 | 0.58 | 0.53 | 0.47 | 0.38 |
| Catalyst Contact Time, Seconds | 530 | 530 | 366 | 540 | 540 | 350 |
| Pressure in Regenerator, Lbs./Sq. in | 11.0 | 12.5 | 12.5 | 12.5 | 13.5 | 13.5 |

Figure 1:
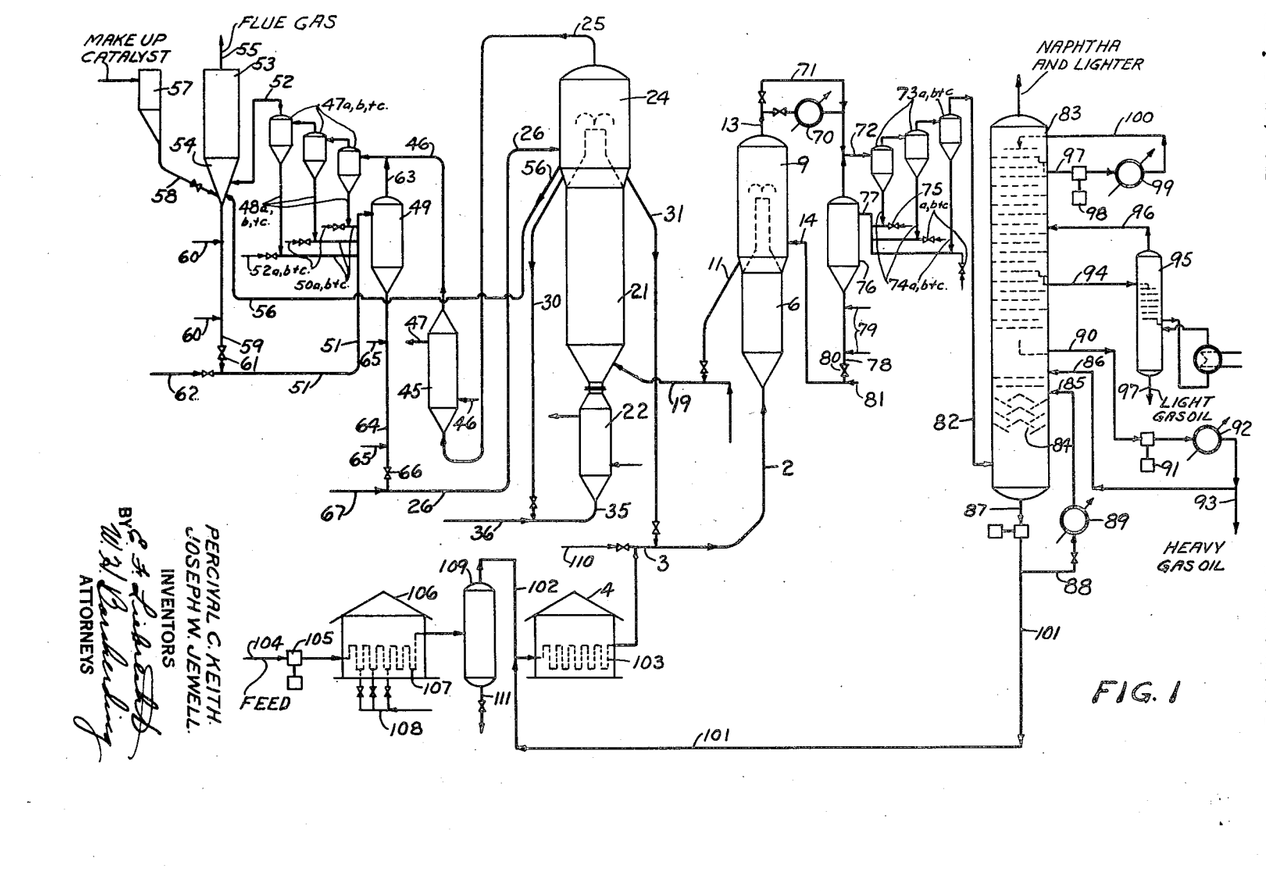
Fig. 1 illustrates diagrammatically a suitable complete process flow and arrangement of apparatus for use in the practice of the invention.

A preferred system for the recovery of residual catalyst present in the overhead product from separator 24 is illustrated in Fig. 1. Referring to this figure gaseous regeneration products mixed with a relatively small portion of the catalyst originally present therein are withdrawn from the upper part of hopper 24 through line 25 and pass to a series of separating zones constituted by suitable gas-solids separators such as cyclones, Cottrell precipitators, filters, or the like, the recovered material being eventually returned to hopper 24 through line 26.

The gaseous suspension in outlet pipe 25 consists essentially of flue gas and residual suspended regenerated catalyst including both relatively fine and relatively coarse particles. This suspension is preferably supplied to the recovery system at a superatmospheric pressure sufficiently high to impel it completely therethrough and into the atmosphere from the final separating zone, the pressure in the successive separating zones being progressively lower in the direction of the flow of the suspension by reason of the pressure drop in the interconnecting lines and gas-solids separating means. Incidental to such separation it has been ascertained that classification and segregation of the particles occurs, particularly segregation of the extremely fine particles in the final separating zone, this zone being a Cottrell precipitator as shown, or any other suitable means utilized for the separation of the last increment of the suspended particles.

In certain instances cooling of the gaseous suspension passing through line 25 may be desirable, as for example by passing it through a suitable cooler or heat exchanger 45 through which a heat exchange medium is circulated through lines 46 and 47, thereby effecting a reduction in temperature and volume of the suspension passing therethrough, it being understood however that such cooling is not essential and may be omitted.

From cooler 45 the gaseous suspension passes by line 46 to a suitable gas-solids separator, or preferably a series of such separators such as cyclone separators or the like 47a, 47b and 47c. In each of these a part of the suspended particles is separated and withdrawn from the bottom of the separators through tail pipes 48a, 48b and 48c. Material discharged from these tail pipes may be conveyed to a regenerated catalyst recovery hopper 49 through lines 50a, 50b and 50c by way of transfer line 51 by means of a suitable fluid conveying medium, such as steam, supplied by jets through lines 52a, 52b and 52c.

From separator 47a the suspension passes by line 52 to a Cottrell precipitator 53 or other suitable means for separating the extremely fine particles from the gaseous suspension, the separated particles being collected in the bottom hopper 54 of the precipitator, and the separated gas exiting overhead to the atmosphere through line 55.

Cottrell precipitator 53 is preferably operated under approximately atmospheric pressure, and a pressure reduction valve may be provided in line 52 for regulating the pressure so that the desired pressure may be maintained in separator 53 irrespective of the pressure in the discharge line leading from cyclone 47a.

A continuous stream of previously separated relatively coarse particles preferably is supplied to a mixing zone in hopper 54 through line 56 from hopper 24 for the purpose of mixing with and bringing the fines to a condition which may be described as "flowable." Coarse particles for this purpose supplied through line 56 may be supplemented by fresh or "make-up" catalyst supplied to the system from hopper 57 through line 58. Such "make-up" catalyst is necessary to replace unavoidable losses of catalyst from the system and to compensate for any gradual permanent decrease in activity of the circulated catalyst. An aerating medium preferably is supplied to the bottom of the hopper 54 by means not shown, but similar to elements 27 and 28, for aerating the mixture therein and maintaining it in a readily flowable condition.

From hopper 54 the aerated mixture flows into an outlet standpipe 59, operating in a manner similar to standpipe 30, an aerating fluid such as steam being supplied thereto along its length through lines 60. Standpipe 59 is preferably of a height sufficient to provide a fluid head to balance the pressure differential between the hopper 54 and the zone of relatively high pressure to which the separated fines are returned to the system, for example hopper 49 as shown or hopper 24. From standpipe 59 the mixture is discharged by means of a suitable valve such as a slide valve 61 into transfer line 51. Steam or other suitable conveying medium is supplied by line 62 to line 51 to convey the mixture to hopper 49 or if desired to any other zone.

In passing through line 51 the mixture is combined with the streams from lines 50a, 50b and 50c and passes to collecting hopper 49 wherein the combined fractions are separated in the bottom of the hopper, and the gaseous suspending medium is separated overhead through line 63 and passes into line 46 leading to the cyclone separators. From hopper 49 the separated solids are withdrawn through a standpipe 64 operating on a principle similar to standpipes 30 and 59 and to which a suitable aerating medium is supplied through lines 65. Standpipe 64 is preferably of a height sufficient to balance the difference in pressure between hopper 49 and hopper 24. From standpipe 64 the solids are fed through a slide valve 66 into transfer line 26 wherein they are suspended by suitable conveying fluid such as steam supplied through line 67 and conveyed therethrough to hopper 24 and combined with the initially separated material.

The operation of the regenerated catalyst recovery system may be further exemplified by reference to conditions obtaining in the specific regeneration operation illustrated by Table 2—A. Pursuant to this example, the proportions of regenerated powdered cracking catalyst separated in the various separating zones, based upon the quantity of material entering the system through line 19, were approximately as follows:

|  | Per cent |
|---|---|
| Hopper 24 | 75 |
| Cyclone 47a | 20 |
| Cyclone 47b | 2.5 |
| Cyclone 47c | 1 |
| Precipitator 53 | 1.5 |

The percentage recovery in hopper 24 based upon the total solids passing through outlet 23 including the recycled catalyst from line 30, is substantially greater than on the above basis, amounting to about 95%.

In this example, pressure conditions obtaining throughout the regeneration system were approximately as follows:

| Zone | Pressure, Lbs./Sq. In. |
|---|---|
| Regenerator 21 (base) | 16 |
| Hopper 24 | 8 |
| Line 46 | 3 |
| Cyclone 47a (inlet) | 2.3 |
| Cyclone 47b (inlet) | 1.8 |
| Cyclone 47c (inlet) | 1.3 |
| Precipitator 53 (inlet) | 0.4 |
| Valve 61 | 5 |
| Hopper 49 | 3.5 |
| Valve 66 | 9.5 |

In this particular example, the fines collected in hopper 54 were mixed with relatively coarse particles introduced through line 56 in about equal proportions. Obviously in certain instances the addition of more or less coarse particles through line 56 may be necessary for best results.

Referring back to the conversion side of the system, the vaporous conversion products exiting overhead from hopper 9 through line 13 are passed to a suitable gas-solids separation system for recovery of the catalyst remaining suspended therein, and which recovered catalyst is eventually returned to hopper 9 through line 14. The recovery system may suitably comprise a series of cyclone separators similar in design and operation to those previously described with respect to the regenerated catalyst recovery system. The reaction vapors withdrawn through line 13 preferably contain a relatively small proportion of the total catalyst introduced through line 2, since hopper 9 is of a design capable of separating about 90% or more of the total catalyst.

The vapor mixture in line 13 may be cooled, if desired, by passing it through a cooler 70, to a temperature above the condensation point of the vapors, but sufficiently low to substantially reduce the volume of gas passing to the cyclone separators, thereby increasing the concentration of the catalyst in the vapors and thus facilitating catalyst separation. This cooler may be omitted and the suspension passed directly by by-pass line 71 and line 72 to a series of cyclone separtors 73a, 73b and 73c. In each of the cyclones a portion of the catalyst is separated in the bottom of the cyclone and the separated gas withdrawn overhead and passed to the subsequent separator stage. The separated fractions are picked up from the discharge end of the tail pipes 74a, 74b and 74c by a jet of steam introduced through valves 75a, 75b and 75c, respectively, and conveyed to a collecting drum 76 through transfer line 77. Due to pressure drop in the cyclone recovery system and interconnecting lines, drum 76 is at a pressure substantially lower than the pressure prevailing in hopper 9. The recovered catalyst is withdrawn from drum 76 through a catalyst standpipe 78 of a height sufficient to balance this difference in pressure, an aerating medium being supplied to the standpipe through lines 79.

Catalyst is discharged from the bottom of standpipe 78 through valve 80 and is conveyed by a suitable medium such as steam introduced through line 81 to hopper 9 by line 14.

Normally a very small proportion of the catalyst is left in the vapors exiting from the last cyclone 73c and this residual catalyst is preferably recovered by partial condensation and scrubbing in a lower section of the fractionation tower, as described in U. S. Patent No. 2,374,073 to Arnold Belchetz, dated April 17, 1945. This fraction will normally constitute less than 1%, for example about 0.2% of the total circulated catalyst.

The fractionator for the recovery and separation of the conversion products may be of conventional design, that shown being illustrative of a suitable type utilized in the commercial operation for which data is given in Table 1—A. Inspections of the feed and products for this particular operation are tabulated in Table 3.

From cyclone 73c the mixture of conversion product vapors and residual catalyst is passed by line 82 to the base of a combination scrubbing and fractionating tower 83. The mixture passes upwardly in the tower over baffles 84 in countercurrent flow with liquid reflux or condensate supplied through lines 85 and 86. A partial condensate consisting of the highest boiling constituents of the vapors is thus formed in which the residual catalyst is concentrated and withdrawn from the bottom of the tower through line 87. A portion of the bottoms product is diverted through line 88 through a cooler 89 and returned by line 85 over the baffles to provide the required temperature gradient in the scrubbing section. A heavy gas oil fraction may be withdrawn by side draw-off line 90 and passed by pump 91 through cooler 92. A portion of this gas oil may be withdrawn from the system through line 93, and another part returned to the tower for refluxing through line 86.

A light gas oil may be withdrawn through side draw-off line 94 and stripped in side stripper 95, the overhead product being returned through line 96 to the tower, and a light gas oil being withdrawn from the system through line 97.

Condensate may be withdrawn from the top portion of the tower through line 97, passed by pump 98 through heat exchanger 99, and returned through line 100 at a suitable temperature to provide the required reflux at the top of the tower.

In the operation shown naphtha and lighter products are withdrawn overhead and may be further separated in a suitable recovery system including an absorber, stripping tower, and stabilizer, or by other suitable means, to produce the lighter products indicated on the following Table 3.

TABLE #3

(a) Gas oil charging stock 31.1° API consisting of mixture of—
  (1) 7500 bbls. per day M. C. virgin gas oil.
  (2) 2500 bbls. per day of gas oil derived by thermal cracking of a M. C. crude to coke.

| (b) Products | API Gravity | Yields |
|---|---|---|
| | | Bbls. per day |
| Heavy gas oil | 25.6 | 2,445 |
| Light gas oil | 35.0 | 2,445 |
| Heavy naphtha | 50.3 | 3,340 |
| Light naphtha | 98.5 | 1,650 |
| C₃ and C₄ Hydrocarbons | | 570 |

The high boiling fraction containing the residual catalyst may be recycled to the conversion stage by line 101, suitably by combining this fraction with the feed vapors in line 102 entering the super-heat coil 103 in furnace 4, or preferably by heating and vaporizing this fraction in a separate coil and then combining the vapors with those from the super-heat coil. The preferred feed preparation means utilized to vaporize and heat the hydrocarbon feed is dependent upon the character of the charging stock. In certain cases as with a gas oil feed of the type given in Table 3 the preheated liquid feed may be introduced directly through line 102 to coil 103 which in this instance vaporizes and super-heats the feed, steam preferably being added to the coil in an amount as indicated in Table 1—A. With heavier feed stocks the modified form of feed preparation means shown, including a vaporizing furnace 106 and a flash drum 109, is suitably employed. In the latter case preheated liquid feed stock from line 104 is fed by pump 105 into vaporizing coil 107 in furnace 106. Steam is introduced from line 108 in suitable quantities to coil 106. The heated charge is then flash evaporated in flash drum 109, the feed vapors being taken overhead through line 102, and bottoms withdrawn from the system through line 111. Additional steam may be added to the feed vapors in line 3 through line 110.

In the foregoing a preferred procedure and arrangement of apparatus for practicing the invention has been described, however, it will be apparent to those skilled in the art that various modifications thereof may be made without departing from the essential features of the invention. For example, the movement and circulation of the catalyst to and from the various zones may be effected by "solids pumps" such as described in Kinyon Patent 1,553,539 in place of catalyst standpipes. Also, other types of gas-solids separating means for recovering finely divided solids from the gaseous products withdrawn from the conversion and regeneration zones may be substituted for those shown. The fresh or regenerated catalyst need not be introduced into the conversion zone in mixture with the feed vapors, but may be introduced separately as for example by providing a separate line interconnecting the bottom of standpipe 31 and reactor 6 and conveying the catalyst therethrough by a suitable medium such as steam, or standpipe 31 may terminate directly in the base of reactor 6. By a further modification the withdrawal of used catalyst as well as the addition of spent catalyst to the reactor may be effected through inlets and outlets separate from those utilized for the introduction and withdrawal of vapors, as for example by a process flow such as that shown in Fig. 3.

Certain variable operating conditions in the practice of the process may follow and be controlled pursuant to conventional practice in the art of vapor phase catalytic cracking of high boiling hydrocarbons, including such factors as the selection of suitable charging stock, catalytic material, conversion temperatures, and pressures.

Primary operating variables distinctively controlled, pursuant to the present invention, are the rate of feed of the high boiling hydrocarbons and the rate of feed of the catalyst to the reaction zone and the weight of catalyst in said zone.

The rate of feed of the hydrocarbon charge to a reactor of given dimensions is maintained within such limits that the upward velocity of the vapors through the zones is relatively low and sufficient to form a dense phase or mass of catalyst therein. Conversely, for the conversion of a given quantity of charging stock in a given unit of time, the cross-sectional area of the reactor must be of the dimensions requires to provide the desired low vapor velocity therein.

The rate of fresh catalyst feed is dependent upon the desired average catalytic activity of the dense phase of catalyst in the conversion zone, and fresh catalyst is continually added at a rate adapted to maintain such activity at the desired value as the conversion proceeds. Used catalyst is withdrawn at the same average rate as fresh catalyst is added, therefore, the average time a catalyst particle remains in the reactor (catalyst resident time) is determined by the catalyst feed rate and may be calculated by dividing the weight of catalyst in the reactor by the catalyst feed rate per minute. The concentration (density) of catalyst in the dense phase is dependent primarily upon the particular low vapor velocity maintained. Within limits, an increase or decrease of the rate of catalyst feed apparently has no substantial or significant effect on the concentration (density) of the dense phase. A further factor effecting the optimum feed rate of catalyst to the conversion zone is a condition which may be termed the "catalyst level phenomenon." Dependent upon the height of the reactor and with low velocities, two distinct phases of catalyst concentration are present in the reactor, a lower dense phase and an upper phase wherein the concentration of catalyst is relatively very dilute, the boundary or interface between the phases being at a horizontal plane intermediate the vapor inlet and outlet. It has been ascertained that the distance of this interface from the top outlet 7 in reactor 6, other conditions being fixed, is dependent upon the rate of catalyst feed and that the magnitude of this distance varies inversely with the rate of catalyst feed. Accordingly, the rate of feed is normally and preferably regulated (or, a fixed catalyst feed rate being assumed, the height of the reactor fixed) so that the upper level of the dense catalyst phase will be confined to the upper part of the reactor, this level or interface being indicated in reactor 6 by dotted line A and in regenerator 21 by dotted line B.

The weight of catalyst in the reactor (a fixed height of reactor being assumed) is dependent upon the concentration of the dense phase (in turn dependent primarily upon the particular low velocity maintained) and the distance of the upper level of the dense phase from the upper vapor outlet (the latter in turn being dependent upon the catalyst feed rate).

Accordingly, proceeding on the above noted principles pursuant to this invention, the rate of feed of hydrocarbon vapors and rate of feed of the catalyst to the conversion zone are preferably controlled within such limits that the vapors of the high boiling hydrocarbons flow upwardly through the conversion zone at a velocity sufficiently low to form a dense phase or mass of the catalyst in said zone, and fresh catalyst is added to said dense phase and corresponding amounts of used catalyst withdrawn therefrom at a rate adapted to maintain the average catalytic activity of said mass of catalyst at a suitable value and preferably also at a suitable rate to maintain the level of said dense phase within the confines of the upper part of the reaction zone.

The effect of variations in the several operating conditions over a wide range is disclosed by the illustrative runs given in the following Table 4. In these runs the feed stock consisted of a 35° A. P. I. Mid-Continent gas oil having an initial boiling point of 470° F. and end point of 736° F. (A. S. T. M.). The catalyst employed was a silica-alumina type of cracking catalyst consisting of powdered "Super-Filtrol," the particle size distribution of the catalyst being approximately 10% 0–10 microns, 20% 10–20 microns, 20% 20–30 microns, 20% 30–40 microns, and 30% 40+ microns. In Table 4, the ratio of the weight of catalyst feed per hour to the weight of oil feed per hour constitutes the "cat./oil" weight ratio. Catalyst resident time "cat. time mins." for both reactor and regenerator was calculated by dividing the weight of catalyst in the reactor by the catalyst feed rate per minute. The vapor velocities at the inlet of the reactor were calculated on the assumed basis that the catalyst volume was negligible. The outlet vapor velocity was calculated on the basis of the outlet conditions of temperature and pressure, and mols of product produced. The arithmetical average of inlet and outlet velocities was divided by the reactor length to obtain the superficial oil contact time (oil time).

TABLE IV

35° A. P. I. Mid-Continent gas oil—Catalyst Super-Filtrol

| Run Number | Av. Crkg. Temp., °F. | W./Hr./W. | Cat. Time, Mins. | Vol. Per Cent Gas Oil Disapp. | Cat./Oil | Oil Time, Secs. | Wt. Per Cent Steam | Wt. Per Cent Carbon on Regen. Cat. | Velocity In | Velocity Out | Cat. Conc., #/Cu. Ft. | Vol. Per Cent Gasoline | Vol. Per Cent Cycle Oil | Vol. Per Cent Excess C4's | Wt. Per Cent Dry Gas | Wt. Per Cent Carbon |
|---|---|---|---|---|---|---|---|---|---|---|---|---|---|---|---|---|
| *Reactor—Vertical 2½ In. x 12 Ft. Tube—w./hr./w. Greater Than 3.0* | | | | | | | | | | | | | | | | |
| 4965 | 910 | 12.9 | 1.3 | 39.4 | 3.7 | 3.6 | 14.1 | 0.44 | 2.80 | 3.90 | 7.0 | 36.1 | 60.6 | 4.8 | 2.9 | 1.5 |
| 4973 | 910 | 8.4 | 3.1 | 43.3 | 2.3 | 4.8 | 7.8 | 0.44 | 1.96 | 3.16 | 10.6 | 38.8 | 56.7 | 5.6 | 3.6 | 1.8 |
| 4976 | 910 | 6.9 | 2.5 | 37.5 | 3.5 | 10.4 | 0.0 | 0.35 | 1.1 | 2.2 | 13.2 | 33.1 | 62.5 | 4.7 | 3.1 | 2.1 |
| 4977 | 910 | 14.3 | 2.7 | 30.6 | 1.6 | 5.4 | 0.0 | 0.40 | 1.6 | 3.0 | 10.3 | 29.0 | 69.4 | 2.7 | 2.1 | 1.3 |
| 4984 | 950 | 14.5 | 3.7 | 30.4 | 1.1 | 5.2 | 0.0 | 0.36 | 1.6 | 3.1 | 10.3 | 28.8 | 69.6 | 2.7 | 2.3 | 1.1 |
| 4990 | 1,000 | 23.8 | 2.0 | 32.4 | 1.1 | 4.5 | 0.0 | 0.34 | 1.8 | 5.6 | 5.5 | 26.7 | 67.6 | 3.3 | 5.2 | 1.0 |
| 4995 | 905 | 34.4 | 1.4 | 26.2 | 1.2 | 4.1 | 4.2 | 0.27 | 2.4 | 3.5 | 4.3 | 26.1 | 73.8 | 1.5 | 1.6 | 0.9 |
| 5007 | 910 | 8.3 | 3.8 | 37.4 | 1.9 | 6.4 | 1.8 | 0.30 | 1.3 | 2.5 | 10.9 | 34.5 | 62.6 | 3.9 | 3.1 | 1.5 |
| 5008 | 905 | 4.6 | 3.3 | 48.8 | 4.0 | 5.9 | 13.3 | 0.28 | 1.6 | 2.5 | 10.3 | 41.1 | 51.2 | 7.6 | 4.6 | 2.4 |
| 5013 | 905 | 3.5 | 5.4 | 48.2 | 3.2 | 7.1 | 3.4 | 0.28 | 1.87 | 1.6 | 13.4 | 42.9 | 51.8 | 5.4 | 3.6 | 2.8 |
| 5030 | 900 | 162.0 | 0.1 | 23.4 | 2.9 | 3.7 | 9.5 | 0.50 | 2.07 | 3.58 | .79 | 22.9 | 76.6 | 0.6 | 1.2 | 1.4 |
| 5031 | 900 | 15.7 | 1.0 | 38.2 | 3.8 | 4.9 | 7.0 | 0.67 | 2.0 | 2.9 | 5.8 | 34.3 | 61.8 | 4.7 | 2.5 | 2.3 |
| 5081 | 895 | 8.8 | 1.5 | 44.3 | 4.6 | 5.5 | 7.1 | 1.23 | 1.8 | 2.9 | 10.0 | 38.3 | 55.7 | 5.3 | 3.1 | 3.7 |
| 5094—1 | 900 | 10.0 | 1.8 | 43.2 | 3.4 | 5.3 | 7.0 | 0.79 | 1.8 | 2.7 | 8.8 | 38.3 | 56.8 | 5.9 | 3.0 | 2.4 |
| 5094—2 | 900 | 9.3 | 1.7 | 44.7 | 3.9 | 5.4 | 7.1 | 0.75 | 1.8 | 2.7 | 9.4 | 39.2 | 55.3 | 5.6 | 3.4 | 2.9 |
| 5113—1 | 900 | 6.4 | 2.0 | 52.2 | 4.7 | 6.4 | 9.9 | 0.48 | 1.5 | 2.2 | 10.0 | 44.8 | 47.8 | 7.1 | 4.2 | 3.1 |
| 5113—2 | 900 | 6.2 | 2.0 | 48.4 | 5.0 | 6.4 | 10.0 | 0.55 | 1.5 | 2.3 | 10.3 | 40.7 | 51.6 | 7.8 | 4.0 | 3.2 |
| 5149 | 895 | 41.3 | 0.3 | 29.4 | 4.8 | 3.6 | 10.2 | 0.81 | 3.0 | 3.7 | 3.0 | 26.2 | 70.6 | 3.3 | 2.2 | 2.0 |
| 5158 | 895 | 4.4 | 2.1 | 55.4 | 6.7 | 10.6 | 0.0 | 1.15 | 0.7 | 1.5 | 14.6 | 44.9 | 44.6 | 7.8 | 5.1 | 5.6 |
| 5162—1 | 900 | 5.8 | 1.6 | 56.8 | 6.7 | 6.3 | 10.1 | 0.96 | 1.5 | 2.3 | 10.9 | 46.7 | 43.2 | 8.0 | 5.4 | 4.6 |
| 5162—2 | 895 | 5.8 | 1.5 | 54.7 | 6.7 | 6.3 | 10.0 | 0.85 | 1.5 | 2.3 | 10.9 | 45.0 | 45.3 | 8.8 | 5.1 | 4.2 |
| 5172 | 900 | 5.7 | 1.6 | 54.4 | 6.6 | 6.5 | 10.0 | 0.65 | 1.5 | 2.2 | 11.1 | 42.4 | 45.6 | 9.1 | 5.8 | 4.6 |
| 5178 | 910 | 5.6 | 1.7 | 57.1 | 6.3 | 6.0 | 10.1 | 0.73 | 1.5 | 2.5 | 11.5 | 46.7 | 42.9 | 9.4 | 5.8 | 3.7 |
| 5196 | 900 | 4.8 | 1.8 | 62.4 | 7.1 | 6.8 | 10.1 | 0.75 | 1.3 | 2.3 | 13.4 | 50.5 | 37.6 | 9.9 | 5.9 | 5.0 |
| 5201 | 905 | 5.4 | 3.6 | 50.9 | 3.0 | 8.0 | 9.7 | 0.74 | 1.2 | 1.8 | 12.1 | 45.5 | 49.1 | 5.8 | 4.5 | 2.7 |
| 5305—1 | 895 | 7.9 | 3.5 | 44.2 | 2.7 | 6.5 | 9.1 | 0.37 | 1.5 | 2.2 | 10.9 | 42.3 | 55.8 | 1.4 | 4.0 | 2.0 |
| *Reactor—Vertical 2½ In. x 12 Ft. Tube—w./hr./w. Less Than 3.0* | | | | | | | | | | | | | | | | |
| 5022 | 900 | 1.5 | 4.9 | 68.2 | 8.2 | 13.2 | 9.2 | 0.47 | 0.67 | 1.15 | 17.0 | 49.7 | 31.8 | 12.3 | 7.6 | 7.6 |
| 5039 | 900 | 1.7 | 2.3 | 65.9 | 15.3 | 8.5 | 17.2 | 0.70 | 1.1 | 1.6 | 15.8 | 46.9 | 34.1 | 12.2 | 6.5 | 9.0 |
| 5053 | 900 | 1.7 | 2.9 | 65.6 | 12.3 | 8.2 | 17.5 | 0.52 | 1.1 | 1.7 | 15.8 | 47.5 | 34.4 | 12.0 | 7.7 | 7.4 |
| 5058 | 900 | 2.2 | 2.7 | 59.8 | 9.9 | 4.1 | 37.4 | 0.39 | 2.6 | 3.3 | 11.2 | 45.7 | 40.2 | 11.4 | 6.6 | 4.5 |
| 5059 | 900 | 1.6 | 3.3 | 64.8 | 11.2 | 16.5 | 0.0 | 0.56 | 0.43 | 0.95 | 16.7 | 47.0 | 35.3 | 9.3 | 8.1 | 8.0 |
| 5101 | 905 | 2.9 | 2.8 | 59.2 | 7.4 | 8.2 | 8.3 | 0.74 | 1.1 | 1.7 | 14.6 | 45.3 | 40.8 | 10.0 | 6.0 | 5.6 |
| 5108 | 900 | 1.2 | 2.3 | 65.9 | 21.9 | 11.4 | 10.3 | 1.84 | 0.8 | 1.3 | 21.9 | 45.4 | 34.1 | 10.3 | 7.2 | 10.7 |
| 5120—1 | 905 | 1.7 | 2.8 | 72.5 | 12.6 | 12.9 | 10.5 | 0.59 | 0.7 | 1.1 | 15.2 | 51.6 | 27.5 | 13.3 | 8.1 | 9.2 |
| 5120—2 | 900 | 1.6 | 3.4 | 72.5 | 11.4 | 12.9 | 10.3 | 0.50 | 0.7 | 1.1 | 16.4 | 53.3 | 27.5 | 12.0 | 7.5 | 9.1 |
| 5132 | 895 | 0.74 | 4.0 | 82.0 | 20.3 | 20.7 | 9.6 | 0.53 | 0.45 | 0.7 | 17.6 | 50.6 | 18.0 | 16.0 | 9.1 | 16.6 |
| 5147 | 900 | 0.75 | 4.3 | 80.1 | 18.6 | 20.8 | 9.9 | 0.53 | 0.43 | 0.71 | 17.0 | 43.8 | 19.9 | 16.5 | 13.8 | 15.7 |

From the specific examples given it will be evident that an operating condition of primary importance in the practice of the invention is the relatively low velocity and resulting high concentration of catalyst maintained in the conversion and regeneration stages. Referring for example, to Table 1—A it will be noted that the catalyst concentration in reactor 6 was 18 lbs. per cu. ft. as compared with a catalyst concentration of about 1 lb. per cu. ft. in the reactor inlet line 2. Under such high concentration conditions, the flow of the catalyst may be described as that of a compacted turbulent mass or moving bed.

In order to provide this dense or concentrated phase of the catalyst in the conversion and regeneration stages, low vapor velocities of the order of about 6 ft. per second or less, and preferably of about 4 ft. per second or less are contemplated. Vapor velocity ranges regarded as especially suitable for the practice of the process in vertical reaction vessels of the type shown in Fig. 2, are about 6 to 0.5 ft. per second, preferably about 1.5 to 2 ft. per second. Even lower vapor velocities than these indicated minimums may be utilized to advantage with the modified type of conversion system illustrated in Fig. 3.

It is further contemplated that the practice of the process, under most conditions, may be satisfactorily effected, utilizing a catalyst to oil feed weight ratio within the range of about 0.5:1.0 to 20:1.0 and preferably within the more restricted range of about 2:1 to 8:1, and with a value of w./hr./w. within the range of about 1.0 to 25.0 and preferably within the more restricted range of about 2.5 to 10.0.

The modified process flow illustrated in Fig. 3 differs from that of Figs. 1 and 2 in that the catalyst is introduced to and withdrawn from the conversion zone and regeneration zone by catalyst inlets and outlets separate from the inlet and outlet for all or the major proportion of the vapors undergoing conversion, or the regeneration fluid. Elements of Fig. 3 having a generally similar function to those described in detail in connection with Figs. 1 and 2 are designated in Fig. 3 with a similar numeral with the suffix $a$ and hence detailed description of these elements is superfluous. Operating variables likewise may be controlled for this process flow pursuant to the principles disclosed in connection with Figs. 1 and 2. Feed vapors are introduced through line 3a and a suitable manifold 5a substantially uniformly throughout the bottom area of the reactor so that the dense phase of catalyst therein is maintained in an "aerated" flowable condition. Regenerated catalyst from standpipe 39a is introduced by a current of a suitable conveying medium such as steam (or a mixture of steam and part of the feed vapors supplied through line 114) through catalyst inlet line 1a and flows laterally through the reactor transversely to the entering vapors and is withdrawn at the opposite side of the reactor at a controlled rate through standpipe 11a by means of valve 18a. The height of level of the dense phase of catalyst in the reactor 6a is regulated by operation of valve 18a, and in this respect differs from the flow described in connection with Figure 2. The horizontal level of the dense phase of catalyst is preferably maintained below the vapor outlets 8a at a suitable distance to provide a sufficient catalyst-vapor disengaging space such that only a relatively small minimal amount of the used catalyst is carried overhead with the vapor through line 13a. The proportion of the total catalyst thus withdrawn through line 13a, as pointed out previously in connection with line 13, constitutes only a relatively small fraction of the total quantity of catalyst circulated. This catalyst may be separated from the vapor in a suitable gas-solids separator 112 and returned by line 113 to the reactor at the steam stripping zone above the catalyst standpipe outlet 11a. Similarly in the regeneration zone, the spent catalyst is introduced thereto by a separate outlet 19a from standpipe 11a and withdrawn at the opposite end of the regeneration zone by a separate outlet standpipe 30a. The level of catalyst in the regeneration zone is controlled in the same manner as in the conversion zone so that only a relatively small amount of catalyst passes out of the zone overhead through the outlets 23a to the gas-solids recovery system. The vapor velocities used in this type of process flow may be quite low, the limiting quantity being that required to maintain the body of catalyst in an aerated or flowable condition.

Any of the various known types of cracking catalysts may be utilized in the practice of the invention. The preferred catalysts are those of the silica-alumina, or silica-magnesia type adapted to produce a satisfactory yield of high octane gasoline. Either silica-alumina catalyst consisting of activated clay prepared by the acid treatment of natural clays, for example the commercial product "Super-Filtrol" or a synthetically prepared silica-alumina catalyst such as those disclosed in U. S. Patents Nos. 2,391,481 and 2,391,482 to Robert Ruthruff, both dated December 25, 1945, may be employed. The catalyst is preferably employed in finely divided or powdered condition, for example with particles ranging from about 1 to 100 microns. Other conditions such as temperature, pressures, feed stocks, and the like, may be selected and controlled pursuant to conventional practice in the art of vapor phase catalytic cracking of high boiling hydrocarbons.

We claim:

1. In a catalytic hydrocarbon conversion system wherein hydrocarbon vapors pass upwardly through a reaction zone in contact with a dense turbulent suspended catalyst phase and thence to an enlarged catalyst settling zone wherein spent catalyst from said settling zone is then transferred to a regeneration zone and contacted with regeneration gases flowing upwardly therein at such a velocity as to maintain the catalyst in a dense turbulent suspended catalyst phase, wherein gases from the regeneration zone pass to an enlarged settling zone from which catalyst is transferred to the conversion zone and wherein catalyst fines are separated from gases and vapors leaving said respective settling zones, the method of returning said catalyst fines to the system which comprises discharging said fines to a hopper exterior of the respective contacting zones and settling zones, and positively injecting said fines by means of steam into the settled catalyst flowing from said respective settling zones.

2. In a catalytic hydrocarbon conversion system wherein hydrocarbon vapors pass upwardly through a reaction zone in contact with a dense turbulent suspended catalyst phase and thence to an enlarged catalyst settling zone wherein spent catalyst from said settling zone is then transferred to a regeneration zone and contacted with regeneration gases flowing upwardly therein at such a velocity as to maintain the catalyst in a dense turbulent suspended catalyst phase, wherein gases from the regeneration zone pass to an enlarged settling zone from which catalyst is transferred to the conversion zone and wherein catalyst fines are separated from gases and vapors leaving said respective settling zones, the method of returning said catalyst fines to the system which comprises discharging said fines to a hopper exterior of the contacting zones and settling zones, and positively injecting said fines by means of steam into the settled catalyst flowing from a settling zone.

3. In a catalytic conversion system of the type wherein a gas or vapor passes upwardly in a contacting zone and is contacted in said zone with a dense turbulent suspended catalyst phase, wherein the bulk of the catalyst is removed from gases and vapors in an enlarged settling zone, wherein a body of settled catalyst is maintained in the lower part of the settling zone, and wherein residual catalyst material is removed from gases or vapors by means of cyclone separators, the method of combining cyclone separated catalyst with settled catalyst which comprises discharging said cyclone separated catalyst into an external collection hopper and positively impelling cyclone separated catalyst into the bed of settled catalyst in said settling zone.

PERCIVAL C. KEITH.
JOSEPH W. JEWELL.

REFERENCES CITED

The following references are of record in the file of this patent:

UNITED STATES PATENTS

| Number | Name | Date |
|---|---|---|
| 1,799,858 | Miller | Apr. 7, 1931 |
| 1,873,783 | Osterstrom et al. | Aug. 23, 1932 |
| 1,984,380 | Odell | Dec. 18, 1934 |
| 2,231,231 | Subkow | Feb. 11, 1941 |
| 2,231,424 | Huppke | Feb. 11, 1941 |
| 2,253,486 | Belchetz | Aug. 19, 1941 |
| 2,271,148 | Becker et al. | Jan. 27, 1942 |
| 2,273,076 | Voorhees | Feb. 17, 1942 |
| 2,300,151 | Hemminger | Oct. 27, 1942 |
| 2,303,047 | Hemminger | Nov. 24, 1942 |
| 2,305,569 | Degnen | Dec. 15, 1942 |
| 2,310,377 | Voorhees | Feb. 9, 1943 |
| 2,311,984 | Guild | Feb. 23, 1943 |
| 2,319,710 | Stratford et al. | May 18, 1943 |
| 2,326,705 | Thiele et al. | Aug. 10, 1943 |
| 2,353,495 | Payne | July 11, 1944 |
| 2,353,505 | Scheineman | July 11, 1944 |

FOREIGN PATENTS

| Number | Country | Date |
|---|---|---|
| 102,166 | Australia | Sept. 20, 1937 |
| 533,037 | Germany | Sept. 8, 1931 |